United States Patent [19]

Wolf

[11] 3,968,998
[45] July 13, 1976

[54] TOP UNLOADER FOR SILOS
[75] Inventor: Johann Wolf, Scharnstein, Austria
[73] Assignee: Firma Johann Wolf Gesellschaft m.b.H. KG, Scharnstein, Austria
[22] Filed: Dec. 6, 1974
[21] Appl. No.: 530,502

[30] Foreign Application Priority Data
Jan. 21, 1974 Austria.................................. 484/74
Sept. 25, 1974 Austria............................. 7732/74

[52] U.S. Cl. ............................. 302/56; 214/17 DB; 241/260.1; 302/50
[51] Int. Cl.² ........................................ B65G 53/48
[58] Field of Search ............ 214/17 DB; 302/56, 37, 302/50; 241/260.1

[56] References Cited
UNITED STATES PATENTS

| | | | |
|---|---|---|---|
| 2,591,411 | 4/1952 | Delsman et al. | 302/37 |
| 2,677,474 | 5/1954 | Long et al. | 302/56 |
| 2,801,137 | 7/1957 | Clay | 302/56 |
| 2,816,804 | 12/1957 | Harrer | 302/56 |
| 2,888,253 | 5/1959 | VanDusen | 214/17 DB |
| 3,319,809 | 5/1967 | Prentice | 302/56 |
| 3,450,277 | 6/1969 | Boppart | 214/17 DB |
| 3,451,566 | 6/1969 | Hanson | 214/17 DB |
| 3,547,283 | 12/1970 | Beebe | 214/17 DB |
| 3,822,796 | 7/1974 | Buschbom | 214/17 DB |

Primary Examiner—John J. Love
Assistant Examiner—Jeffrey V. Nase
Attorney, Agent, or Firm—Young & Thompson

[57] ABSTRACT

The unloader serves to remove chopped silage from a circular silo. A frame is adapted to be supported on the inside surface of a peripheral wall of the silo and to be lowered in said silo when silage has been removed. A unit is carried by said frame and mounted for rotation on a vertical axis at the center of said frame and comprises a radially extending cutting and feeding screw provided at its periphery with cutting and tearing elements. The unit also comprises an ejecting blower disposed radially inwardly of said screw and comprising an impeller and an inake opening which faces said screw and is at least as large in diameter as said screw and exposed throughout its periphery. The unit further comprises drive means for driving said screw and blower. The drive means comprise a hollow shaft which carries said impeller and is operable to rotate the same, and a drive shaft which extends through said hollow shaft and is operatively connected to said screw.

8 Claims, 3 Drawing Figures

TOP UNLOADER FOR SILOS

This invention relates to a top unloader for circular silos, which unloader comprises cutting means, which revolve in a circular orbit and cut off the silage and feed it to an ejecting blower, which is disposed in the central region of the silo. The ejecting blower ejects the silage through a pipe bend and a succeeding pipeline and through the next adjacent manhole or over the top rim of the silo.

Various top unloaders for silage have already been disclosed. For unloading the silage, cutting chains have been used, which revolve around two spaced apart chain sprockets, as well as horizontally disposed cutting and feeding chains. These cutting tools move slowly in a circular orbit, which is centered in mounting means, which in most cases comprise a three-armed frame, which is supported by rollers at the inside surface of the peripheral wall of the silo. The ejecting blower is also disposed at the center and serves to convey the silage which has been cut off by the cutting means and has been fed to the center. To prevent a digging of the unloader into the body of silage, the unloader is provided with a counterweight or with readjustable suspension means comprising a winch, which enable the unloader to be lowered in steps which correspond to the height of the layer which has been removed. Drive means comprise a built-on electric motor, which moves in unison with the revolving cutting means. In this arrangement, current must be supplied by means of slip rings and brushes. In other arrangements, the motor is connected to the frame so that the latter does not move relative to the silo and the current can be supplied directly. In that arrangement, a much higher energy expenditure is involved in the means for driving the ejecting blower and the cutting means.

The motor is switched on and off at a point disposed outside the silo, either on the outside surface of the silo or in a barn.

The use of such remote control and the requirement that a frequent entrance into the silo should be avoided results in a demand for a very high safety of operation. This can be promoted in that the cutting means are structurally simple and comprise only a few moving parts and an enclosed transmission. Because even silage having long stalks, such as chopped clover or alfalfa, should be unloaded without trouble, special care must be taken to prevent a clogging at the transition from the cutting and feeding screw to the ejecting blower.

During the unloading particularly of long-stalked chopped silage, such as hay, partly dried hay, and the like, from high silos provided with top unloaders, trouble often arises because the silage is not sufficiently removed near the periphery of the silo. In known arrangements, this is avoided by the use of a star-shaped cutter, which is arranged at the end of the cutting and feeding screw and facilitates the removal of the silage from the peripheral zone. On the other hand, that arrangement has the disadvantage that the silage is wound up at the outer bearing of the cutting and feeding screw and of the star-shaped cutter. In such case, the wound-up silage may become so highly compacted between the end of the cutting screw and the bearing that the cutting screw is blocked. This trouble may often arise with long-stalk silage and the removal of such trouble is a difficult operation. In most cases, the silage must be forced out with a knife or chisel. The trouble which has been described has also the result that the silage cut off by the star-shaped cutter cannot be continuously transferred to the screw so that there is an accumulation of loose silage, which further promotes the winding-up and sooner or later blocks the screw. As the feeding of animals is usually performed by one person in addition to other agricultural work, the loss of time involved in such trouble is highly undesirable.

It is an object of the invention to provide a top unloader which eliminates these disadvantages and which enables a trouble-free feeding of the cut-off silage, even when it consists of long-stalk chopped silage, to the ejecting blower and a satisfactory removal of silage from the periphery of the silo.

In a top unloader for removing chopped silage from a circular silo, which unloader comprises a multi-arm frame, which is supported on the inside surface of the silo wall and adapted to be lowered when silage has been removed, and radially extending cutting means, an ejecting blower, and drive means associated therewith, which are mounted for rotation about a vertical axis at the center of the frame, this object is accomplished according to the invention in that the cutting means comprise a known cutting and feeding screw, which is provided at its periphery with cutting and tearing elements and which has a drive shaft extending through a hollow shaft driving the impeller of the ejecting blower, and that the ejecting blower has an intake opening, which is disposed near the screw and is as large as or larger in diameter than the cutting and feeding screw and is exposed throughout its periphery. According to a preferred feature of the invention the cutting and feeding screw is connected to the drive shaft by a universal joint or a flexible coupling disposed outside the impeller of the ejecting blower. According to another preferred feature of the invention, the diameter of the ejecting blower is as large as or smaller than approximately twice the diameter of the cutting and feeding screw and the speed of the ejecting blower is at least four times the speed of the cutting and feeding screw.

According to another preferred feature of the invention, a hollow shaft carrying the impeller of the ejecting blower is cantilever supported in a closed transmission housing, to which a drive motor is flange-connected. In the transmission, that bearing of the shaft which is nearer to the impeller of the ejecting blower is particularly strong because that bearing indirectly supports also the feeding screw. The impeller of the ejecting blower and the cutting and feeding screw are driven at different speeds by means of a scaled-down reduction gearing in the closed transmission housing.

According to another preferred feature of the invention, the outer end of the cutting and feeding screw is supported by a self-aligning bearing. The cutting and feeding screw is provided with a cover which surrounds the screw on all sides and is open only on the underside and is adjustable in height relative to the cutting and feeding screw.

As means for centering the unloader in the body of silage, a conical screw-shaped drill or a plurality of radial ribs is or are disposed below the outlet of the blower and centered on the axis of rotation of the gyrating part of the unloader, which gyrating part comprises the cutting and feeding screw, the ejecting blower, the electric motor and the transmission.

The blower housing comprises a segment which extends downwardly below the flight circle of the cutting means and pushes the silage aside so as to form a depression therein. As a result, the cutting and feeding screw is effective throughout its length.

According to a preferred feature of the invention, a satisfactory removal of silage near the periphery of the silo is accomplished in that an outer bearing for the cutting and feeding screw is provided on the outside of a thin bearing plate, which extends approximately transversely to the screw shaft. The outer end of the cutting and feeding screw has only a motion-permitting clearance relative to the bearing plate, and the outer bearing is entirely covered by a star-shaped cutter, which defines only a motion-permitting clearance with the periphery of a bearing housing and only a motion-permitting lateral clearance with the bearing plate. According to another preferred feature of the invention the bearing plate is secured to the frame and in its lower half, which faces the silage, is semicircular and flush with the flange of the self-aligning bearing so that the bearing plate does not protrude beyond the bearing flange.

With this arrangement, the silage which has been loosened by the star-shaped cutter can be received by the cutting and feeding screw without trouble. This transfer is further improved in that the star-shaped cutter has the shape of a cone, which has a smaller end facing the cutting and feeding screw whereas the cutting teeth are inclined relative to the axis of the screw and lead in the sense of rotation at the end which faces the wall of the silo. The star-shaped cutter consists of a massive casting whose mass is mainly concentrated at the periphery so that a flywheel effect is obtained.

Owing to the small thickness of the outer bearing plate, it is sufficient to support the bearing in a radial direction. The axial forces acting on the screw shaft through the cutting and feeding screw and the star-shaped cutter are taken up by an inner thrust bearing.

The arrangement of the outer bearing according to the invention and the suspension enable a trouble-free flow of the silage to an ejecting blower or a chute and prevent a drawing-in and winding-up of longer stalks. This prevents the feared build-up of silage near the periphery, which build-up is the cause of the winding-up.

Two embodiments of the top unloader according to the invention are shown diagrammatically and by way of example on the accompanying drawings, in which.

Figure 1:
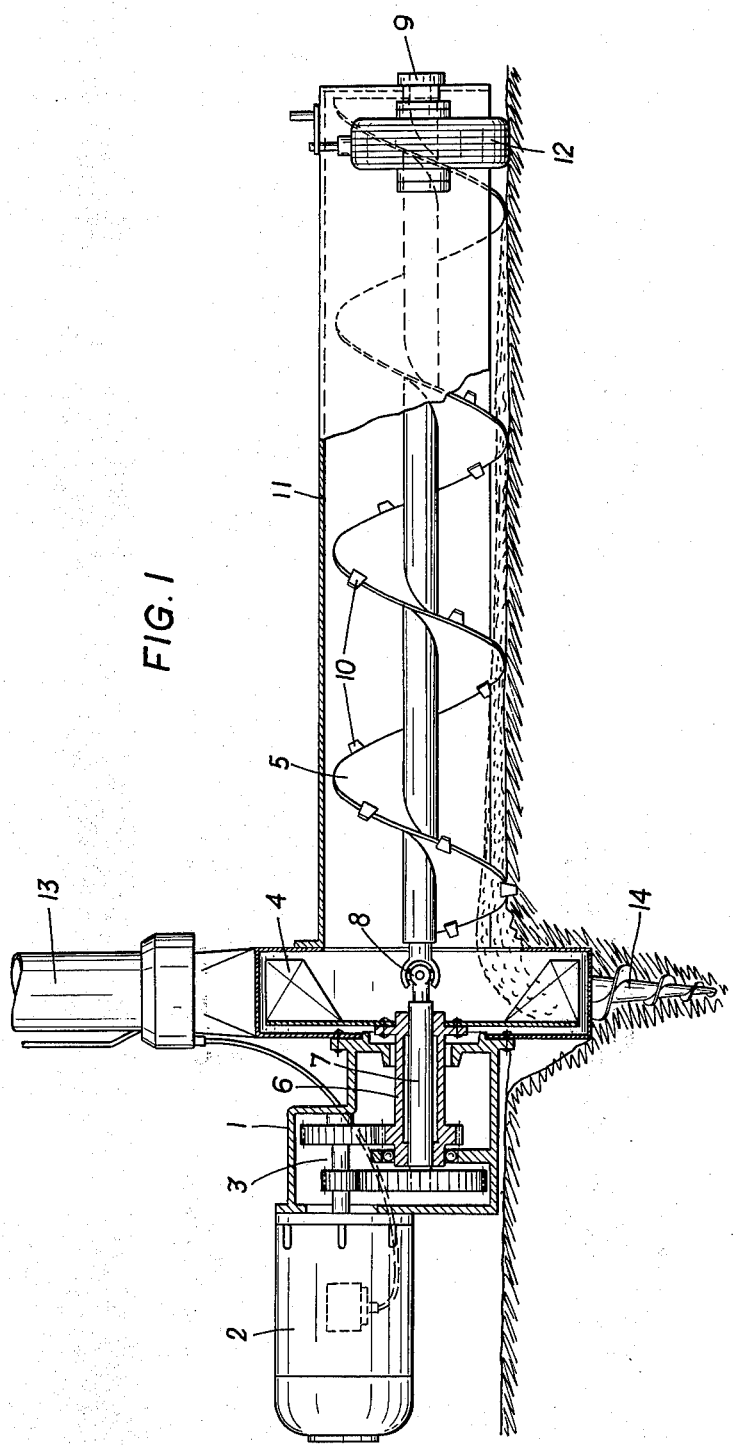
FIG. 1 is a side elevation, partly in section, showing one embodiment.

In the embodiment shown in FIG. 1, an electric motor 2 is flanged to a closed transmission housing 1 and by a two-stage reduction gear 3 drives an impeller 4 of an ejecting blower and a cutting and feeding screw 5 at different speeds. The impeller 4 of the ejecting blower is supported by a cantilever supported, hollow shaft 6, which is driven at high speed. The drive shaft 7 for the cutting and feeding screw 5 is mounted in the hollow shaft 6 and driven at low speed. A universal joint 8 for transmitting the drive is disposed outside the impeller 4 of the ejecting blower adjacent to the screw. At the opposite end, the cutting and feeding screw 5 is supported by a self-aligning bearing 9. Replaceable cutting and tearing teeth 10 are arranged at the periphery of the cutting and feeding screw 5 and serve to assist the loosening of the silage from the body of silage. Except for the side facing the body of silage, the entire cutting and feeding screw 5 is enclosed by a casing 11, which is adjustable in height relative to the cutting and feeding screw 5. Supporting wheels 12 and skids permit of a limited penetration into the body of silage to the extent of the predetermined thickness of the layer to be removed at a time.

Because the cutting and feeding screw 5 is not supported by a bearing at the inlet of the ejecting blower, the entire intake cross-section remains exposed and the cut-off silage can flow freely into the ejecting blower. Slip rings and brushes are provided between the outlet of the ejecting blower and a fixed pipe bend 13 for the silage to be ejected. On the underside of the ejecting blower, a conical, screw-shaped drill 14 for centering the implement is disposed in the axis of rotation of the rotating part of the unloader.

Figure 2:
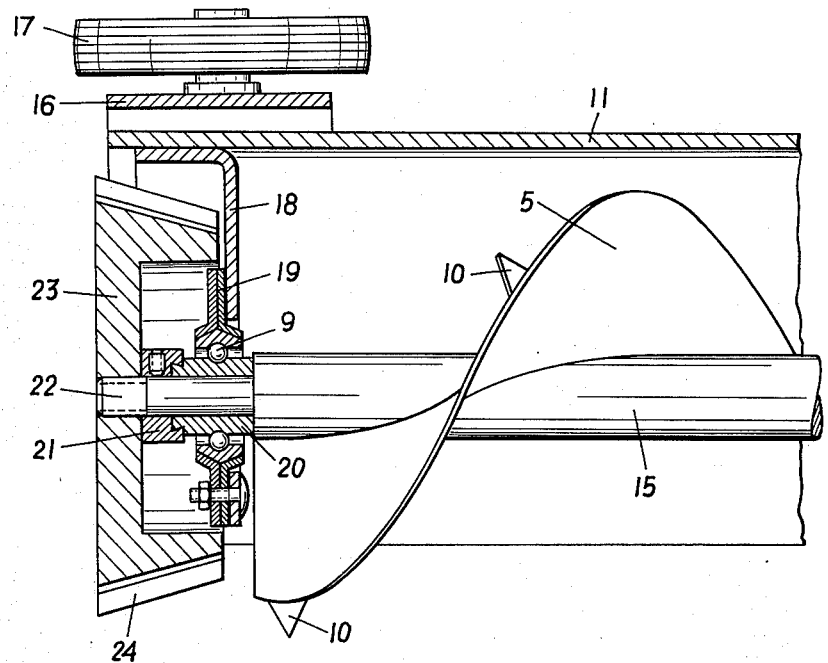
FIG. 2 is a side elevation, partly in section, showing another embodiment of the top unloader.
Figure 3:
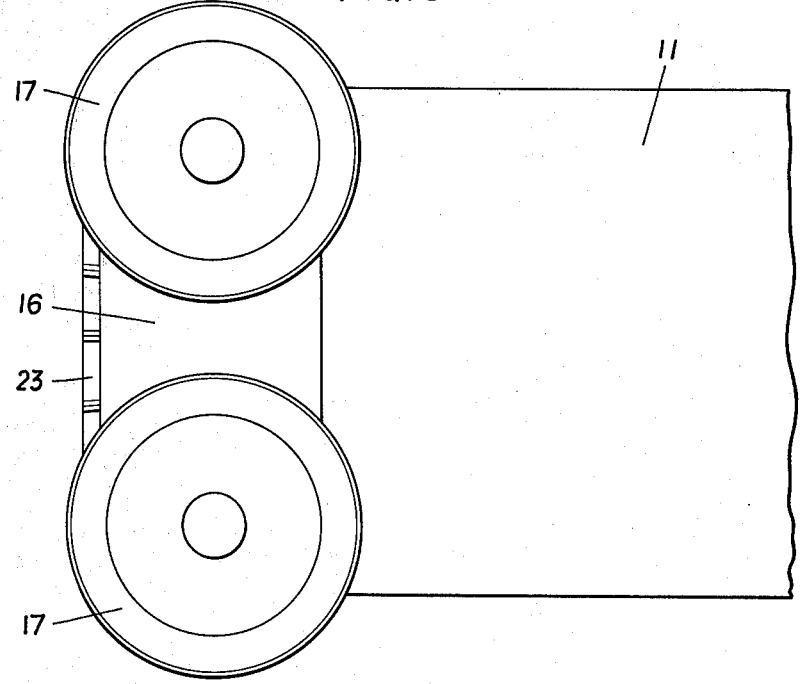
FIG. 3 is a top plan view showing the outer end of the top unloader of FIG. 2.

In the embodiment shown in FIGS. 2 and 3, the cutting and feeding screw 5 is also provided at its periphery with cutting and tearing teeth 10 and is mounted on a tube, which constitutes the screw shaft 15. The casing 11 constitutes a jib arm and forms a shell, which encloses the cutting and feeding screw 5 and which is open on the underside. A bracket 16 is mounted on the outer end of the casing 11 and carries two axially adjustable rollers 17, which bear on the inside of the silo. A preferably round bearing housing 19 for the self-aligning bearing 9 is screw-connected to a thin bearing plate 18, which is secured in the casing 11.

The bearing housing 19 is centered in the bearing plate 18 and on the side facing the screw is flush with the bearing plate. There is only a motion-permitting clearance between the bearing plate 18 and the end face of the screw 5. The inner race 20 of the self-aligning bearing 9 is clamped by a set collar 21 on a journal 22 of the screw shaft 15. An outer star-shaped cutter 23 constitutes a flywheel and covers the bearing housing 19 and defines a small clearance therewith. The star-shaped cutter 23 is keyed or screw-threadedly connected to the journal 22 of the screw shaft 15. The star-shaped cutter 23 has the shape of a cone and with its smaller end faces the cutting and feeding screw 5. The star-shaped cutter 23 comprises inclined cutting teeth 24, which lead on the outside in the sense of rotation. The cutting and feeding screw 5 is mounted on the inside in a thrust bearing, which takes up the inwardly directed thrust of the unloader.

The embodiments which have been shown and described serve only to explain the nature of the invention, which is not restricted to details.

What is claimed is:
1. A top unloader for removing chopped silage from a circular silo, comprising
   a frame,
   a unit which is carried by said frame and mounted for rotation on a vertical axis at the center of said frame and comprises
   a radially extending cutting and feeding screw provided at its periphery with cutting and tearing elements,
   an ejecting blower disposed radially inwardly of said screw and comprsing an impeller and an intake opening, which faces said screw and is at least as large in diameter as said screw and exposed throughout its periphery, drive means for driving said screw and blower, which drive means comprise a hollow shaft, which carries said impeller and is operable to rotate the same, and a drive shaft, which extends through said hollow shaft and is operatively connected to said screw, said ejecting blower having a diameter which is not more than twice the diameter of said screw, said drive means being operable to drive said impeller at a speed which is at least four times the speed of said screw, said drive means comprising a drive motor and a transmission connecting said drive motor to said hollow shaft, said transmission being contained in a closed transmission housing in which said hollow shaft is cantilever supported, said screw being surrounded by a casing which is open only on its underside.

2. A top unloader as set forth in claim 1, which comprises a universal joint connecting said drive shaft to said screw.

3. A top unloader as set forth in claim 1, which comprises a conical screw-shaped drill carried by said unit and disposed below the outlet of said blower and on the axis of said unit.

4. A top unloader as set forth in claim 1, which comprises a self-aligning bearing supporting the outer end of the cutting and feeding screw.

5. A top unloader as set forth in claim 4, in which said self-aligning bearing has a flange, and a bearing plate which has a semicircular, downwardly facing lower half, which is flush with said flange and which supports said bearing.

6. A top unloader as set forth in claim 1, in which said frame carries a thin bearing plate, which extends transversely to the axis of said screw, the outer end of said screw is supported by an outer bearing on the outside of said bearing plate and has only a motion-permitting clearance relative to said bearing plate, said outer bearing is surrounded by a bearing housing, and said screw carries at its outer end a star-shaped cutter, which completely covers said outer bearing and which has only a motion-permitting clearance relative to said bearing housing and only a motion-permitting lateral clearance relative to said bearing plate.

7. A top unloader as set forth in claim 6, in which said screw is supported by an inner thrust bearing.

8. A top unloader as set forth in claim 6, in which said star-shaped cutter constitutes a flywheel and has the shape of a cone having a smaller end facing said screw and said cutter comprises cutting teeth, which are inclined relative to the axis of the screw and lead at the axially outer end in the sense of cutting rotation.

* * * * *